United States Patent [19]

Dauplaise et al.

[11] Patent Number: 5,393,827
[45] Date of Patent: Feb. 28, 1995

[54] PREPARATION OF HIGH SOLIDS POLYMERIC MICROEMULSIONS

[75] Inventors: David L. Dauplaise, Stamford; Michael P. O'Toole, Norwalk, both of Conn.

[73] Assignee: Cytec Technology Corp., Wilmington, Del.

[21] Appl. No.: 106,955

[22] Filed: Aug. 17, 1993

[51] Int. Cl.$^6$ .............................. C07F 2/32; C07F 2/16
[52] U.S. Cl. ..................................... 524/801; 524/804; 524/831; 524/700; 526/310
[58] Field of Search ................ 524/801, 804, 700; 526/310

[56] References Cited

U.S. PATENT DOCUMENTS

| | | | |
|---|---|---|---|
| 3,297,621 | 1/1967 | Taft | 260/29.6 |
| 4,521,317 | 6/1985 | Candau et al. | 252/8.55 |
| 4,681,912 | 7/1987 | Durand et al. | 524/827 |
| 4,954,538 | 9/1990 | Dauplaise et al. | 523/223 |
| 4,968,435 | 11/1990 | Neff et al. | 210/734 |
| 5,110,864 | 5/1992 | Robinson et al. | 524/801 |
| 5,185,411 | 2/1993 | Jueptner et al. | 524/801 |

FOREIGN PATENT DOCUMENTS 0462365 12/1991 European Pat. Off. .... D21H 21/54

OTHER PUBLICATIONS

Holtzscherer et al., "Application of the Cohesive Energy Ratio Concept (CER) to the Formation of Polymerizable Microemulsions," Colloids and Surfaces, 29, (1988) 411–423.

Holtzscherer et al., "Modification of Polyacrylamide Microlatices by Using a Seeding Procedure," Institut Charles Sadron, pp. 1473–1481.

Morgan, "Multifeed Emulsion Polymers: The Effects of Monomer Feed Sequence and the Use of Seed Emulsion Polymers," J. App. Poly. Sci., vol. 27, 2033–2042 (1982).

Naidus, "Emulsion Polymers for Paints," Industrial and Engineering Chemistry, vol. 45, No. 4, pp. 712–717 (Apr. 1953).

Rohm and Haas, "Emulsion Polymerization of Acrylic Monomers," pp. 7, 14–18.

C. Holtzscherer S. Candau in K. L. Mittal and P. Bothorel, eds, Surfactants in Solution, in press.

*Primary Examiner*—Paul R. Michl
*Assistant Examiner*—Olga Asinovsky
*Attorney, Agent, or Firm*—F. M. Van Riet

[57] ABSTRACT

A novel method for preparing anionic, cationic or nonionic polymeric microemulsions comprising a multistep process to achieve high solids and low emulsifier and oil content. The polymeric microemulsions are useful in papermaking as retention aids, in solid-liquid separation as flocculants and in enhanced oil recovery as a drive fluid.

10 Claims, No Drawings

PREPARATION OF HIGH SOLIDS POLYMERIC MICROEMULSIONS

The present invention relates to a method for preparing anionic, cationic or non-ionic polymeric microemulsions. The present invention also relates to the use of the polymers as retention aids, flocculants and/or drive fluids.

BACKGROUND OF THE INVENTION

Polymer containing microemulsions are known to those skilled in the art. They are stable, transparent water-in-oil systems that are stabilized by surfactants. Water soluble polymers such as polyacrylamide are effective in papermaking to improve drainage, formation and retention. Fast drainage and greater retention of fines contribute to lower cost. In addition, they are useful in the flocculation of suspended solids, such as sewage sludge and in the thickening of cellulosic paper pulp suspensions. The increasing cost of materials has made it highly desirable to produce flocculating agents which produce higher separation at lower dose levels. Finally, they are used in enhanced oil recovery processes as drive fluids to push through underground oil reservoirs.

Polymerization of monomers in emulsions is well known to those skilled in the art. Polymers produced by these techniques have found widespread industrial application. Further, some of the techniques described in the prior art disclose a variety of multi-stage addition techniques for use in emulsion polymerization methods. Typically, the prior art emulsion disclosures teach adding the second stage as an emulsion and have high aqueous content or no oil.

The Rohm and Haas product literature entitled "Emulsion Polymerization of Acrylic Monomers" pp. 7, 14–18, teaches multi-stage emulsion polymerization of ethyl acrylate to achieve higher solids (43–46%), and to control heat. However, the reference discloses polymerization in an aqueous emulsion with the later steps comprising further addition of the aqueous emulsion.

Naidus, "Emulsion Polymers for Paints," Industrial and Engineering Chemistry, v. 45, n. 4 (1953), discusses adding monomer, or monomer in an aqueous emulsion, continuously during polymerization to provide a homogeneous composition. The author teaches that the monomer addition technique gives emulsions of smaller aqueous droplet size because of a larger emulsifier to monomer ratio; and that the monomer emulsion addition technique is more stable with less coagulum since adequate emulsification is not dependent upon the agitation.

Taft, U.S. Pat. No. 3,297,621, teaches a two-step emulsion polymerization process to control heat wherein the first step comprises adding non-emulsified monomer to a reactor containing catalyst and an emulsifying solution and the second step comprises adding an aqueous emulsion of monomer to the reactor.

Morgan, "Multifeed Emulsion Polymers," J. Appl. Polymer Sci., v. 27, 2033–42 (1982) teaches a two stage emulsion to form core/shell concept macroemulsions. The author teaches a first step of continuously adding monomer to surfactant and water; and a second step of adding monomer as a water-in-oil emulsion to minimize destabilization of the seed polymer. The changing of the feed from monomer to water-in-oil emulsion may cause HLB problems.

Robinson et al., U.S. Pat. No. 5,110,864, teach a cationic monomer delayed addition process to produce a polymer having improved retention properties vis-a-vis a polymer produced in a comparable one-step process. The disclosed monomers are cationic although acrylamide and acrylic acid are mentioned as comonomers. The patentees teach adding a portion of the monomer containing aqueous phase to the oil phase, emulsifying, adding the remaining portion of the aqueous phase without polymerization, and then polymerizing.

Also known in the art is the use of a variety of one-step inverse microemulsion polymerization techniques. The mechanism and reaction kinetics in inverse microemulsions are different than those observed in inverse emulsions. The formation of microemulsions is considerably more complex than the formation of inverse emulsions. Inverse emulsions contain 1–10 micron droplets and size grows continuously. The microemulsion polymerization techniques of the prior art are either one-step processes or add the second portion as an emulsion and require a relatively high surfactant and oil content and which in some cases disclose a transparent monomer microemulsion.

Candau et al., U.S. Pat. No. 4,521,317, teach a process for polymerizing a water soluble monomer in a water-in-oil inverse microemulsion. The patentees teach that the monomer emulsion is transparent, and that the aqueous phase comprises 1–50 percent by weight of the total.

Durand et al., U.S. Pat. No. 4,681,912, teach a process to manufacture inverse microlatices of water soluble copolymers by admixing an aqueous phase containing water soluble monomer and an oil phase with non-ionic surfactant (s) having an HLB range of 8–11 to form a transparent monomer microemulsion and polymerizing. The minimum surfactant concentration is determined according to the formula: $y=5.8x^2-110x+534$ where $x=$HLB value and $y=$surfactant concentration.

Holtzscherer et al., "Application of the Cohesive Energy Ratio Concept (CER) to the Formation of Polymerizable Microemulsions," Colloids and Surfaces 29, (1988), discuss the use of the cohesive energy concept to determine the most efficient use of surfactants in microemulsions. The minimum surfactant content found was 10.8 percent and an optimum HLB of 8.68. Monomer content was 14–22.5 weight percent.

Dauplaise et al., U.S. Pat. No. 4,954,538, teach crosslinked glyoxylated (meth)acrylamides prepared using inverse microemulsion techniques and are disclosed to be useful as wet- and dry- strength agents in paper production.

Honig et al., EP 0 462 365, teach the use of ionic organic microemulsions to provide improved products 2.5 useful in drainage and retention in papermaking.

Holtzscherer et al., "Modification of Polyacrylamide Microlatices by Using a Seeding Procedure," and Holtzscherer et al., K. L. Mittal and P. Bothorel, eds, Surfactants in Solution, in press, teach a seeding procedure applied to inverse acrylamide microlatices to increase polymer content. Higher solid contents are desirable in most industrial applications. However, the acrylamide is precipitated after the first step. The polymer content is 2.02–4.38 weight percent after the first step and 8.22–10.29 weight percent at final. In addition, the oil phase is 88–92 weight percent.

While the prior art microemulsion processes have provided some improvements in the performance of the polymeric products, there still exists a need in the art for further improvements in performance. Further, the amounts of oil and emulsifier employed in the prior art processes are relatively high, thereby making the products more costly.

It is therefore an object of the present invention to produce water-in-oil microemulsions at higher solids levels and lower surfactant and oil content. The multistep microemulsions of the present invention also have superior performance as retention aids, for use in sludge dewatering and as oil recovery drive fluids as compared to products produced from onestep microemulsions of the prior art. The high surfactant and oil content of the prior art emulsions can also have a harmful effect on papermachines, i.e., adversely effects sizing and/or creates foam.

SUMMARY OF THE INVENTION

According to the present invention, there is provided a method for preparing cross-linked or non-cross-linked, polymeric microemulsions, the method comprising (i) preparing an oil phase comprising at least one hydrocarbon liquid and an effective amount of a surfactant or mixture of surfactants; (ii) preparing an aqueous solution comprising at least 27 percent, by weight, of the total aqueous phase of monomers which can be cationic, anionic or non-ionic, and optionally at least one cross-linking agent; and (iii) adding the aqueous solution in at least two portions to the oil phase and then effecting polymerization after the addition of each portion.

Preferably, the polymer phase droplets present as the aqueous phase have a number average size diameter of less than about 750 nm, preferably less than about 300 nm, and a solution viscosity of greater than about 1.1 mPa.s, preferably from about 1.5 to about 4.0 mPa.s. The anionic systems preferably have solution viscosities ranging from about 3.0–7.0, cationic systems preferably from about 1.8–4.5 and non-ionic systems preferably from about 2.0–8.0 in Pa.s when used as flocculants. The microemulsions may further contain cross-linked or non-cross-linked, anionic or cationic polymers to improve drainage formation and retention in papermaking.

In the case of cross-linked polymers, a crosslinking agent content of above about 4 molar parts per million, based on the monomeric units present in the polymer is preferred. Other preferred features of the present invention comprise compositions, as defined above, wherein the cross-linking agent content ranges from about 4 to about 6000 molar parts per million, preferably from about 10 to about 4000 molar parts per million and even more preferably from about 50 to about 4000 molar parts per million.

The preferred cross-linking agents comprise difunctional monomers selected from N,N'-methylenebisacrylamide; N,N'-methylenebismethacrylamide; polyethyleneglycol diacrylate; polyethyleneglycol dimethacrylate; N-vinylacrylamide; glycidyl acrylate; divinylbenzene; acrolein; glyoxal; diepoxycompounds; epichlorohydrin; or mixtures of any of the foregoing. Especially preferred is N,N'-methylenebisacrylamide.

The preferred anionic monomers for use in the practice of the present invention are acrylic acid, methyl acrylic acid and their salts, 2-acrylamido-2-methyl propane sulfonate, sulfoethyl acrylate, sulfoethyl methyl acrylate, vinylsulfonic acid, styrene sulfonic acid, maleic acid and the like. Especially preferred is acrylic acid.

A preferred feature of the present invention, comprises a process employing an aqueous solution comprising acrylic acid as the anionic monomer, methylenebisacrylamide as the cross-linking agent and acrylamide as the non-ionic monomer; an oil phase comprising a saturated hydrocarbon and a surfactant comprising a polyoxyethylene sorbitan hexaoleate and a sorbitan sesquioleate sufficient to produce polymer phase droplets of less than about 750 nm in number average size diameter.

Polymerization may be effected by adding a polymerization initiator, such as sodium metabisulfite or tert-butyl hydroperoxide to the aqueous phase or oil phase; and adding a polymerization activator while adding the aqueous phase to the oil phase, or alternatively, by ultraviolet irradiation.

Also contemplated by the present invention is adding an effective amount of a chain-transfer agent to the aqueous solution, such as an alcohol; a mercaptan; a phosphite; a sulfite or a mixture of any of the foregoing. Further, the process of the present invention may also comprise a step for recovering the composition from the inverse microemulsion.

DETAILED DESCRIPTION OF THE INVENTION

The present invention provides a method for preparing an improved high solids polymer microemulsion at relatively low surfactant levels comprising: (a) preparing an oil phase comprising: (i) at least one hydrocarbon; and (ii) an effective amount of a surfactant or mixture of surfactants to form a microemulsion upon the addition of an aqueous phase; (b) preparing an aqueous phase comprising: (i) at least one ethylenically unsaturated monomer in an amount of at least about 27 percent, by weight, of the total weight of aqueous phase and oil phase; (c) adding a portion of said aqueous phase (b) to said oil phase (a) to form a microemulsion and polymerizing; and (d) adding another portion of said aqueous phase (b) to the product of step (c) to form a microemulsion and polymerizing; wherein the emulsifier to monomer ratio (E/M) after the final portion addition is below about 0.30 and the micro-emulsion produced by said method has improved performance over a microemulsion formed from a method comprising a single addition of the same total amount of aqueous phase.

The selection of the organic phase has a substantial effect on the minimum surfactant concentration necessary to obtain the inverse microemulsion. The organic phase may comprise a hydrocarbon or hydrocarbon mixture. Saturated hydrocarbons or mixtures thereof are the most suitable in order to obtain inexpensive formulations. Typically, the organic phase will comprise benzene, toluene, fuel oil, kerosene, odorless mineral spirits and mixtures of any of the foregoing.

The one or more surfactants are selected in order to obtain an HLB (Hydrophilic Lipophilic Balance) value ranging from about 8 to about 11. Outside this range, inverse microemulsions are not usually obtained. In addition to the appropriate HLB value, the concentration of surfactant must also be adjusted, i.e., sufficient to form an inverse microemulsion. Too low a concentration of surfactant leads to inverse emulsions of the prior art and too high a concentration results in undue costs. Typical surfactants useful in the practice of this invention, in addition to those specifically discussed above, may be anionic, cationic or non-ionic and may be selected from polyoxyethylene (20) sorbitan trioleate, polyoxyethylene sorbitol hexaoleate, sorbitan sesquioleate, sorbitan trioleate, sodium di-2-ethylhexylsulfosuccinate, oleamidopropyldimethylamine; sodium isostearyl-2-lactate and the like.

The aqueous phase (ii) comprises an aqueous mixture of the monomers, and, optionally, the cross-linking agent. The aqueous monomer mixture may also comprise such conventional additives as are desired. For example, the mixture may contain chelating agents to remove polymerization inhibitors, pH adjusters, thermal and redox initiators such as peroxides, organic compounds and redox couples and other conventional additives.

Cationic monomers useful in the practice of this invention include diallyldimethylammonium chloride; acryloxyethyltrimethylammonium chloride; (meth)acrylates of dialkylaminoalkyl compounds, and salts and quaternaries thereof and, in particular, monomers of N,N-dialkylaminoalkyl(meth)acrylamides, and salts and quaternaries thereof, such as N,N-dimethylaminoethylacrylamides; (meth)acrylamidopropyltrimethylammonium chloride and the acid or quaternary salts of N,N-dimethylaminoethylacrylate and the like. Other cationic monomers which may be used herein are of the following general formulae:

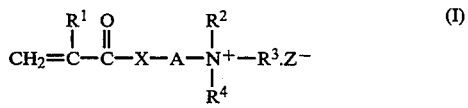

where $R^1$ is hydrogen or methyl, $R^2$ is hydrogen, or lower alkyl of $C_1$ to $C_4$, $R^3$ and $R^4$ are the same or different and independently represent hydrogen, alkyl of $C_1$ to $C_{12}$, aryl, or hydroxyethyl and $R^2$ and $R^3$ or $R^2$ and $R^4$ can combine to form a cyclic ring containing one or more hetero atoms, Z is the conjugate base of an acid, X is oxygen or $—NR^m$ wherein $R^1$ is as independently as defined above, and A is an alkylene group of $C_1$ to $C_{12}$; or

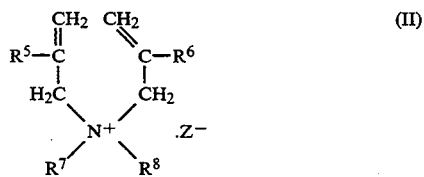

where $R^5$ and $R^6$ are the same or different and independently represent hydrogen or methyl, $R^7$ is hydrogen or alkyl of $C_1$ to $C_{12}$ and $R^8$ is hydrogen, alkyl of $C_1$ to $C_{12}$, benzyl or hydroxyethyl; and Z is as defined above.

Non-ionic monomers, suitable for use in the practice of this invention generally comprise acrylamide; methacrylamide; N-alkylacrylamides, such as N-methylacrylamide; N,N-dialkylacrylamides, such as N,N-dimethylacrylamide; methyl acrylate; methyl methacrylate; acrylonitrile; N-vinyl methylacetamide; N-vinyl methyl formamide; N-vinyl pyrrolidone, mixtures of any of the foregoing and the like.

The present invention further contemplates copolymerizing ionic and nonionic monomers to produce ionic copolymers. Illustratively, acrylamide is copolymerized with an anionic monomer such as acrylic acid to prepare a retention aid for use in papermaking. Anionic copolymers useful in the practice of this invention comprise from about 1 to about 99 parts by weight of non-ionic monomer and from about 99 to about 1 part by weight of anionic monomer based on 100 parts by weight of the anionic and non-ionic monomers taken together; preferably from about 30 to about 99 parts by weight of non-ionic monomer and from about 1 to about 70 parts by weight of anionic monomer, same basis.

Alternatively, cationic copolymers can be prepared in similar manner.

Polymerization of the monomers optionally occurs in the presence of a polyfunctional cross-linking agent to form a cross-linked composition. The polyfunctional cross-linking agent comprises molecules having either at least two double bonds, a double bond and a reactive group, or two reactive groups or mixtures thereof.

Polyfunctional branching agents containing at least one double bond and at least one reactive group include glycidyl acrylate; glycidyl methacrylate; acrolein; methylolacrylamide; mixtures thereof and the like.

Polyfunctional branching agents containing at least two reactive groups include dialdehydes, such as glyoxal; diepoxy compounds; epichlorohydrin; mixtures thereof and the like.

A variety of thermal and redox free-radical initiators including azo compounds, such as azobisisobutyronitrile; peroxides, such as t-butyl peroxide; inorganic compounds, such as potassium persulfate and redox couples, such as ferrous ammonium sulfate ammonium/persulfate, may also be added to the aqueous phase or to the oil phase.

The method of the present invention proceedsby incrementally adding the aqueous phase to the oil phase in at least two incremental additions and effecting polymerization after each addition of aqueous phase, i.e. there are n incremental addition/polymerization stages wherein n ranges from 2 to 10, inclusive. The aqueous phase may be added in substantially equal parts such as halves, thirds, fourths, etc., or the aqueous phase may be added in a dropwise manner to the oil phase. It is further contemplated by the method of the present invention that the aqueous phase additions are added in nonequal parts, as long as there is sufficient monomer in each part to form a microemulsion with the oil phase and obtain the benefits of the present invention.

Preferably, the polymerization is effected by the addition of a polymerization activator, such as sulfur dioxide. Alternatively, polymerization may also be effected by photochemical irradiation processes, irradiation, orby ionizing radiation with a $^{60}Co$ source.

Recovery of the polymer from the microemulsion, if desired, may be effected by inversion of the resulting microemulsion by adding it to water which may contain a breaker surfactant. Optionally, the polymer may be recovered from the microemulsion by stripping or by adding the microemulsion to a solvent which precipitates the polymer, e.g., isopropanol, filtering off the resultant solids, drying and redispersing in water.

The anionic, nonionic, and polymeric products of this invention are useful in facilitating a wide range of solid-liquid separation operations. They may be used to dewater biologically treated suspensions, such as sewage and other municipal or industrial sludges; to drain cellulosic suspensions, such as those found in paper production, e.g. paper waste; and to settle and dewater various inorganic suspensions, e.g. refinery waste, coal waste, etc. For example, a method of flocculation can comprise adding e.g. the cationic polymeric flocculants of the present invention to an aqueous dispersion of suspended solids, such as sewage sludge, in amounts ranging from about 0.1 to about 50,000 ppm of dispersion and then separating the flocculated suspended solids from the dispersion.

The anionic and cationic polymers of the present invention are especially useful as a retention aid for conventional papermaking stocks such as chemical pulps, mechanical pulps, thermomechanical pulps or recycled pulps.

The anionic polymers of the present invention are especially useful in oil recovery methods such as in drive fluids, manufacture of drilling muds, ground consolidation, prevention of inflows in producing oil wells and as completion or fracturation fluids. The solution viscosity of these anionic systems preferably ranges from about 2–8 mPas.

DESCRIPTION OF THE PREFERRED EMBODIMENTS

The following examples illustrate the present invention. They are not be construed to limit the claims in any manner whatsoever except as set forth therein.

EXAMPLE 1

First Step 164.2 grams low odor paraffin oil, 27.6 grams of polyoxyethylene sorbitol hexaoleate (POSH) and 8.2 grams of sorbitan sesqui oleate (SS) whose HLB (hydrophilic lipophilic balance) is 8.7, are mixed under stirring.

62.55 grams of acrylamide, 26.81 grams of acrylic acid, 0.05 gram of ethylenediamine tetraacetate disodium salt dihydrate (EDTA), and 0.04 gram of t-butyl hydroperoxide (TBHP) are dissolved in a mixture of deionized water with 27.0 grams of about 29% ammonium hydroxide to adjust the pH to 8±0.1. The acrylic acid/acrylamide ratio is 30/70. The solution is added to the oil/surfactant mixture. The A/O (aqueous/oil) ratio is 1/1 and the E/M (emulsifier/monomer) ratio is 0.4. After nitrogen purge at room temperature, the resultant microemulsion, milky in appearance, is placed under sulfur dioxide in nitrogen atmosphere. The resultant emulsion is stable and very clear.

Second Step 120 grams of an identical aqueous emulsion (comprising 37.53 grams of acrylamide; 16.09 grams of acrylic acid; 0.03 gram of EDTA; 0.02 gram of TBHP; 50.13 grams of water and 16.2 grams of ammonium hydroxide) is added to the above microemulsion. The A/O ratio is 1.7 and the E/M ratio is 0.25. After nitrogen purge, while cooling to room temperature, the resultant mixture (light cloudy yellow) is placed under a 0.1% sulfur dioxide in nitrogen,atmosphere. The resultant emulsion is stable and clear.

COMPARATIVE EXAMPLE 1A

The procedure of Example 1 is repeated except that all of the aqueous phase is added and reacted in one step. The monomer emulsion is milky and the resultant polymer emulsion is stable and clear.

EXAMPLE 2

The procedure of Example 1 is repeated except that 0.07 gram and 0.04 gram of methylene bisacrylamide are added to the first and second aqueous phases, respectively. The crosslinker level is 800 ppm on monomer. The monomer emulsion is milky. The polymer emulsion is stable and clear.

COMPARATIVE EXAMPLE 2A

The procedure of Example 2 is repeated, except that the entire aqueous phase, with 0.11 gram dissolved methylene bisacrylamide, is added in one step. The monomer emulsion is milky. The resultant polymer emulsion is stable and clear.

EXAMPLE 3

First Step 168 grams of oil, 30.05 grams of POSH emulsifier and 1.95 g SS emulsifier whose combined HLB is 9.8 are mixed under stirring.

32 grams of acrylamide, 48 grams acrylic acid, 0.05 gram TBHP, and 0.32 gram EDTA are dissolved in 76.13 grams of deionized water with 43.5 grams of about 29% ammonium hydroxide to adjust the pH to 7.0±0.1. The acrylic acid/acrylamide ratio is 60/40. The solution is added to the oil/surfactant mixture. The A/O and E/M ratios are 1/1 and 0.4, respectively. After the monomer emulsion (milky) is purged with nitrogen at room temperature, the emulsion is placed under 0.1% sulfur dioxide in nitrogen atmosphere.

Second Step 24.77 grams of acrylamide, 37.15 grams of acrylic acid, 0.04 gram of TBHP, and 0.25 gram of EDTA are dissolved in 20.79 grams of deionized water with 37.0 grams of about 29% ammonium hydroxide to adjust the pH to 7.0±0.1. The solution is added to the above emulsion. The A/O and E/M ratio is 1.6 and 0.21, respectively. After the emulsion is purged with nitrogen and cooled to room temperature, it is placed under a 0.1% sulfur dioxide in nitrogen atmosphere. The polymer emulsion is stable and clear.

COMPARATIVE EXAMPLE 3A

The procedure of Example 3 is followed except that the aqueous phase is added and reacted in one step.

EXAMPLE 4

First Step 168 grams of oil, 30.05 grams of POSH surfactant and 1.95 g SS surfactant whose combined HLB is 9.8 are mixed under stirring.

35.77 grams of acrylamide, 53.88 grams acrylic acid, 1.79 grams of MBA, 0.05 gram TBHP, and 0.36 gram EDTA are dissolved in 60.76 grams of deionized water with 49 grams of about 29% ammonium hydroxide to adjust the pH to 7.0±0.1. The acrylic acid/acrylamide ratio is 60/40. The crosslinker level is 2000 ppm on monomer. The solution is added to the oil/surfactant mixture. The A/O and E/M ratios are 1/1 and 0.36, respectively. After the monomer emulsion (translucent) is purged with nitrogen at room temperature, the emulsion is placed under 0.1% sulfur dioxide in nitrogen atmosphere.

Second Step 120.0 grams of aqueous solution identical to the aqueous solution above (21.46 grams of acrylamide, 32.33 grams of acrylic acid, 0.107 gram of MBA, 0.03 gram of TBHP, 0.22 gram of EDTA, 36.46 grams of deionized water, and 29.4 grams of about 29% ammoniumhydroxide) is added to the above emulsion. The A/O and E/M ratio is 1.7 and 0.21, respectively. After purging while cooling to room temperature, the resulting mixture (lightly clouded) is placed under a 0.1% sulfur dioxide in nitrogen atmosphere. The resultant polymer emulsion is stable and clear.

COMPARATIVE EXAMPLE 4A

The procedure of Example 4 is followed except that the aqueous phase is added and reacted in one step.

Table 1 below depicts in tabular form the results of testing of the materials of Examples 1–4 and Comparative Examples 1A–4A. Polymer phase droplet size is measured by two means.

TEM refers to a Philips 420T analytical transmission electron microscope; Gatan Model 626 TV image pick-up system for 3.1.1; Hitachi VT-S730 S-VHS videocassette recorder. The samples are diluted to 0.05–0.5%. For each sample the distribution and surface volume are generated.

QELS refers to a Nicomp Model HN5–90 Laser Scattering Spectrophotometer; Nicomp Autocorrelator Model Tc100; Spectra-Physics Argon Ion Laser Model 164. The samples are diluted. A minimum of 10,000 counts are generated. An average size is generated from two different channel widths of 1.7 and 2.0. Hydrodynamic radius of suspended colloids is measured.

Viscosity is measured on a Brookfield Viscometer Model LV. Samples are diluted to 0.200%. One measurement is made. Viscometer senses torque required to rotate a spindle in a liquid.

Drainage is measured in Britt CF Dynamic Drainage Jar packed with alum, and varying ratios of retention aid to polymer.

be seen that the two-step method has little or no significant effect on the viscosities of the final polymers.

The above-mentioned patents and publications are hereby incorporated by reference.

As used herein, the terms "emulsifier to monomer ratio" or "(E/M)" is meant to refer to the total amount of monomer added during the preparation of the polymer microemulsion, i.e. the amount which is added in each individual stage of aqueous phase addition plus that which had been added previous to any such stage.

Many variations of the present invention will suggest themselves to those skilled in this art in light of the above-detailed description. Anionic monomers other than acrylic acid can be employed, as can cationic monomers and non-ionic monomers other than acrylamide. Polymerization can also be effected by UV-radiation. Chain-transfer agents may be optionally added to the monomer solution. All such obvious modifications are within the full intended scope of the appended claims.

We claim:

1. A method of preparing an improved high solids polymer water-in-oil microemulsion at relatively low surfactant levels comprising:
   (a) preparing an oil phase comprising:
      (i) at least one hydrocarbon; and
      (ii) an effective amount of a surfactant or mixture of surfactants to form a microemulsion upon the addition of an aqueous phase;

TABLE 1

| | EXAMPLE | | | | | | | | | | | |
|---|---|---|---|---|---|---|---|---|---|---|---|---|
| | 1* | 1 | 1A** | 2* | 2 | 2A** | 3* | 3 | 3A** | 4* | 4 | 4A** |
| Composition, grams | | | | | | | | | | | | |
| Oil[a] | 164.2 | 164.2 | 164.2 | 164.2 | 164.2 | 164.2 | 168.0 | 168.0 | 168.0 | 168.0 | 168.0 | 168.0 |
| SS[b] | 8.2 | 8.2 | 8.2 | 8.2 | 8.2 | 8.2 | 1.95 | 1.95 | 1.95 | 1.95 | 1.95 | 1.95 |
| POSH[c] | 27.6 | 27.6 | 27.6 | 27.6 | 27.6 | 27.6 | 30.05 | 3.05 | 30.05 | 30.05 | 30.05 | 30.05 |
| Acrylamide[d] | 62.55 | 100.08 | 100.08 | 62.55 | 100.08 | 100.08 | 32.0 | 56.77 | 56.77 | 35.77 | 57.23 | 57.23 |
| Water | 83.55 | 133.68 | 133.68 | 83.55 | 133.68 | 133.68 | 76.13 | 96.92 | 96.92 | 60.76 | 97.22 | 97.22 |
| Acrylic acid | 26.81 | 42.90 | 42.90 | 26.81 | 42.90 | 42.90 | 48.0 | 85.15 | 85.15 | 53.88 | 86.21 | 86.21 |
| Ammonium Hydroxide | 27.0 | 43.2 | 43.2 | 27.0 | 43.2 | 43.2 | 43.5 | 80.5 | 80.5 | 49.0 | 78.4 | 78.4 |
| MBA[e] | — | — | — | 0.07 | 0.11 | 0.11 | — | — | — | 1.79 | 1.90 | 1.90 |
| TBHP[f] | 0.04 | 0.06 | 0.06 | 0.04 | 0.06 | 0.06 | 0.05 | 0.09 | 0.09 | 0.05 | 0.08 | 0.08 |
| EDTA[g] | 0.05 | 0.08 | 0.08 | 0.05 | 0.08 | 0.08 | 0.32 | 0.57 | 0.57 | 0.36 | 0.58 | 0.58 |
| E/M ratio | 0.40 | 0.25 | 0.25 | 0.40 | 0.25 | 0.25 | 0.40 | 0.23 | 0.23 | 0.36 | 0.22 | 0.22 |
| Solids content, % | 22.3 | 27.5 | 27.5 | 22.3 | 27.5 | 27.5 | 20.0 | 27.3 | 27.3 | 22.3 | 27.5 | 27.5 |
| Properties | | | | | | | | | | | | |
| Droplet Size - TEM[h] | 47 | 60 | 71 | 48 | 57 | 70 | 50 | 61 | 94 | 54 | 62 | 70 |
| Droplet Size - QELS[i] | 127 | 144 | 170 | 112 | 123 | 167 | 119 | 124 | 169 | 128 | 140 | 166 |
| Viscosity[j], 0.2% | | | | | | | | | | | | |
| Bulk | 239 | 283 | 485 | 141 | 182 | 129 | 629 | 745 | 708 | 50 | 52 | 51 |
| Standard | 5.7 | 5.3 | 12.4 | 1.6 | 1.7 | 1.9 | 6.1 | 5.2 | 5.7 | 1.4 | 1.5 | 1.4 |
| Drainage[k], secs | | | | | | | | | | | | |
| 0.013 | 88 | 89 | — | 81 | 90 | — | 62 | 58 | 61 | 77 | 90 | 109 |
| 0.025 | 80 | 80 | — | 59 | 60 | — | 56 | 52 | 57 | 66 | 63 | 85 |

*Conditions after first addition of aqueous phase
**Comparative example
[a]Low odor paraffin oil
[b]Sorbitan Sesquioleate
[c]Polyethylene (40) sorbitol hexaoleate
[d]50% Aqueous solution
[e]Methylenebisacrylamide
[f]70% Aqueous t-butyl hydroperoxide
[g]Ethylenediamine tetraacetate disodium salt dihydrate
[h]Philips 420T analytical Transmission Electron Microscope
[i]Nicomp Model HN5-90 Laser Scattering Spectrophotometer
[j]Broomfield Viscometer Model LV
[k]Britt CF Dynamic Drainage Jar, % dose, polymer The improvements of the present invention are clearly exemplified by the data in Table 1 above. Smaller droplet sizes and improved drainage times are obtained by a two-step addition of the aqueous phase in side by side comparison with a one-step method using the same E/M ratio and solids content. Further, it can (b) preparing an aqueous phase comprising:
   (i) at least one ethylenically unsaturated monomer in an amount of at least about 27 percent by weight of the total weight of aqueous phase and oil phase;

(c) adding a portion of said aqueous phase (b) to said oil phase (a) to form a microemulsion and polymerizing; and (d) adding another portion of said aqueous phase (b). to the product of step (c) to form a microemulsion and polymerizing;

wherein the emulsifier to monomer ratio after the final portion addition is below about 0.30 and the microemulsion produced by said method has improved performance over a microemulsion formed from a method comprising a single addition of the same total amount of aqueous phase.

2. A method as defined in claim 1 wherein said ethylenically unsaturated monomer comprises an anionic monomer.

3. A method as defined in claim 1 wherein said ethylenically unsaturated monomer comprises a cationic monomer.

4. A method as defined in claim 1 wherein said ethylenically unsaturated monomer comprises a non-ionic monomer.

5. A method as defined in claim 1 wherein said at least one ethylenically unsaturated monomer comprises a mixture of acrylic acid and acrylamide.

6. A method as defined in claim 1, further comprising adding a cross-linking monomer to said aqueous phase (b).

7. A method as defined in claim 1, wherein said portions of said aqueous phase are substantially equal in amount.

8. A method as defined in claim 1, wherein said steps (c) and (d) comprise two or more incremental additions of portions of aqueous phase (b) to said oil phase (a) with polymerization after each incremental addition.

9. A method as defined in claim 8, wherein there are n incremental addition/polymerization stages wherein n ranges from 2 to 10.

10. A method as defined in claim 8, wherein said incremental addition/polymerization stages are performed in dropwise increments.

* * * * *